United States Patent
Dimatteo et al.

(10) Patent No.: US 10,724,122 B2
(45) Date of Patent: Jul. 28, 2020

(54) HIGH OXIDATION-RESISTANT ALLOY AND GAS TURBINE APPLICATIONS USING THE SAME

(71) Applicant: Nuovo Pignone Tecnologie Srl, Florence (IT)

(72) Inventors: Antonella Dimatteo, Florence (IT); Iacopo Giovannetti, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 0 days.

(21) Appl. No.: 16/080,364

(22) PCT Filed: Mar. 10, 2017

(86) PCT No.: PCT/EP2017/055666
§ 371 (c)(1),
(2) Date: Aug. 28, 2018

(87) PCT Pub. No.: WO2017/153573
PCT Pub. Date: Sep. 14, 2017

(65) Prior Publication Data
US 2019/0048440 A1     Feb. 14, 2019

(30) Foreign Application Priority Data
Mar. 10, 2016 (IT) .......... 102016000025497

(51) Int. Cl.
| | | |
|---|---|---|
| *C22C 19/05* | (2006.01) |
| *F01D 5/28* | (2006.01) |
| *F01D 9/02* | (2006.01) |
| *F01D 9/04* | (2006.01) |
| *C22C 1/04* | (2006.01) |
| *B33Y 70/00* | (2020.01) |
| *B33Y 80/00* | (2015.01) |
| *F23R 3/00* | (2006.01) |
| *B33Y 10/00* | (2015.01) |

(52) U.S. Cl.
CPC ............ *C22C 19/057* (2013.01); *B33Y 70/00* (2014.12); *B33Y 80/00* (2014.12); *C22C 1/0433* (2013.01); *F01D 5/28* (2013.01); *F01D 5/286* (2013.01); *F01D 9/02* (2013.01); *F01D 9/04* (2013.01); *F23R 3/002* (2013.01); *B33Y 10/00* (2014.12); *F05D 2220/32* (2013.01); *F05D 2300/13* (2013.01); *F05D 2300/175* (2013.01); *F05D 2300/50* (2013.01); *F23R 2900/00004* (2013.01)

(58) Field of Classification Search
CPC ....... C22C 19/057; C22C 1/043; B33Y 70/00; B33Y 80/00; B33Y 10/00
See application file for complete search history.

(56) References Cited

U.S. PATENT DOCUMENTS

| | | |
|---|---|---|
| 2004/0221925 A1 | 11/2004 | Tamaki et al. |
| 2006/0182649 A1 | 8/2006 | Tamaddoni et al. |
| 2014/0053956 A1 | 2/2014 | Etter et al. |
| 2014/0199164 A1* | 7/2014 | Feng ............ C22C 19/057 415/200 |
| 2014/0295087 A1 | 10/2014 | Rickenbacher et al. |

FOREIGN PATENT DOCUMENTS

RU    2088684 C1    8/1997

OTHER PUBLICATIONS

Giamei, A. F., and D. L. Anton. "Rhenium additions to a Ni-base superalloy: effects on microstructure." Metallurgical transactions A 16.11 (1985): 1997-2005.*
Search Report and Written Opinion issued in connection with corresponding IT Application No. 102016000025497 dated Oct. 28, 2016.
International Search Report and Written Opinion issued in connection with corresponding PCT Application No. PCT/EP2017/055666 dated May 2, 2017.
International Preliminary Report on Patentability issued in connection with corresponding PCT Application No. PCT/EP2017/055666 dated Sep. 11, 2018.

* cited by examiner

*Primary Examiner* — Jessee R Roe
(74) *Attorney, Agent, or Firm* — Baker Hughes Patent Org.

(57) ABSTRACT

An alloy is disclosed, encompassing reduced amounts of Hafnium and Carbon so as to achieve an excellent oxidation resistance, as well as gas turbine applications using the same.

3 Claims, 2 Drawing Sheets

HIGH OXIDATION-RESISTANT ALLOY AND GAS TURBINE APPLICATIONS USING THE SAME

FIELD OF THE INVENTION

Embodiments of the subject matter disclosed herein relate primarily to a high oxidation-resistant alloy and gas turbine applications using the same.

BACKGROUND OF THE INVENTION

For gas turbine applications (buckets, nozzles, shrouds, combustion chambers) nickel-base superalloys are used.

However, in this field, nickel-base superalloys encounter one fundamental limitation, i.e. their oxidation resistance.

In this regard, it should be considered that creep damage in gas turbine components is associated with grain boundary precipitates. These particles provide favourable nucleation sites for grain boundary cavities and micro-cracks. The formation of HfC and M23C6 carbides as grain boundary precipitates can also lead to grain boundary metal depleted zones which are susceptible to corrosive attack.

SUMMARY OF INVENTION

Therefore, there is a general need for materials suitable for gas turbine applications, which show good properties in terms of thermal fatigue at the operating conditions, low density, flexural resistance, creep properties and fracture toughness, as well as an improved oxidation resistance.

An important idea is to provide an alloy wherein the selected elements in selected ranges allows to significantly increase the oxidation resistance by reducing the undesired formation of Hafnium carbide and precipitation of M23C6 carbides. This avoids the additional cost and process step of antioxidant coatings.

This alloy can be produced by conventional processes such as Powder Metallurgy and Investment Casting, as well as innovative Additive Manufacturing technologies (e.g. Direct Metal Laser Melting processes).

First embodiments of the subject matter disclosed herein correspond to a high oxidation-resistant alloy having a nominal composition consisting of:

| | |
|---|---|
| Co | 9.00-9.50 wt % |
| W | 9.30-9.70 wt % |
| Cr | 8.00-8.70 wt % |
| Al | 4.00-15.50 wt % |
| Ti | 0.60-0.90 wt % |
| Ta | 2.80-3.30 wt % |
| Mo | 0.40-0.60 wt % |
| Hf | up to 1.20 wt % |
| Mn | up to 0.05 wt % |
| Si | up to 0.02 wt % |
| C | up to 0.065 wt % |
| Re | 0.00-4.00 wt % |
| Mg, B, Zr, Fe, O, N, S, or a mixture thereof | up to 0.287 wt % |
| Ni | balance | based on the alloy weight.

In general, said alloy shows remarkably improved oxidation resistance properties with respect to conventional Ni super-alloys.

Second embodiments of the subject matter disclosed herein correspond to a gas turbine component, such as a bucket, nozzle, shroud, and combustion chambers, made of the above alloy.

BRIEF DESCRIPTION OF THE DRAWINGS

The accompanying drawings, which are incorporated herein and constitute a part of the specification, illustrate exemplary embodiments of the present subject matter and, together with the detailed description, explain these embodiments. In the drawings.

DETAILED DESCRIPTION

Figure 1:
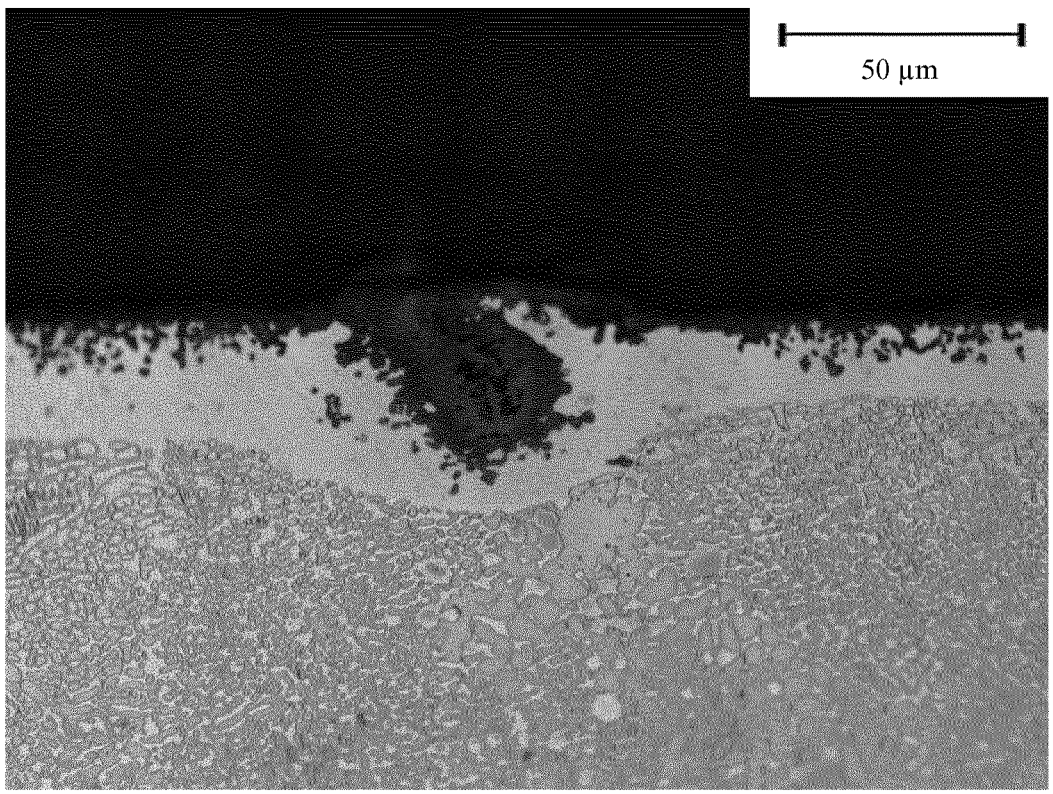
FIG. 1 shows a micrograph taken by Optical Microscope of the oxidation surface of a conventional alloy 'Mar M247 LC', after 1000 h at 980° C.

The following description of exemplary embodiments refers to the accompanying drawings.

The following description does not limit embodiments of the invention. Instead, the scope of embodiments of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

First embodiments of the subject matter disclosed herein correspond to a high oxidation-resistant alloy having a nominal composition consisting of:

| | |
|---|---|
| Co | 9.00-9.50 wt % |
| W | 9.30-9.70 wt % |
| Cr | 8.00-8.70 wt % |
| Al | 4.00-15.50 wt % |
| Ti | 0.60-0.90 wt % |
| Ta | 2.80-3.30 wt % |
| Mo | 0.40-0.60 wt % |
| Hf | up to 1.20 wt % |
| Mn | up to 0.05 wt % |
| Si | up to 0.02 wt % |
| C | up to 0.065 wt % |
| Re | 0.00-4.00 wt % |
| Mg, B, Zr, Fe, O, N, S, or a mixture thereof | up to 0.287 wt % |
| Ni | balance | based on the alloy weight.

It should be appreciated that the alloy above encompasses reduced amounts of Hafnium and Carbon so as to achieve an excellent oxidation resistance, as it will be demonstrated in the following working examples. Furthermore, the above alloy has an improved oxidation resistance due to the specific ranges of W and Cr.

In some embodiments of the high oxidation-resistant alloy, Al is present in an amount of 4.00-10.50 wt %.

In other embodiments of the high oxidation-resistant alloy, Mg is present in an amount of up to 0.008 wt %, and Mo, B, Zr, Fe, O, N, S, or a mixture thereof in an amount of up to 0.879 wt %.

In other embodiments of the high oxidation-resistant alloy, Mo is present in an amount of up to 0.60 wt %, in one embodiment 0.40-0.60 wt %, and Mg, B, Zr, Fe, O, N, S, or a mixture thereof in an amount of up to 0.287 wt %.

In other embodiments of the high oxidation-resistant alloy, B is present in an amount of up to 0.015 wt %, in one embodiment 0.005-0.015 wt %, and Mg, Mo, Zr, Fe, O, N, S, or a mixture thereof in an amount of up to 0.872 wt %.

In other embodiments of the high oxidation-resistant alloy, Zr is present in an amount of up to 0.015 wt %, in one embodiment 0.005-0.015 wt %, and Mg, Mo, B, Fe, O, N, S, or a mixture thereof in an amount of up to 0.872 wt %.

In other embodiments of the high oxidation-resistant alloy, Fe is present in an amount of up to 0.20 wt %, and Mg, Mo, B, Zr, O, N, S, or a mixture thereof in an amount of up to 0.687 wt %.

In other embodiments of the high oxidation-resistant alloy, O is present in an amount of up to 0.02 wt %, and Mg, Mo, B, Zr, Fe, N, S, or a mixture thereof in an amount of up to 0.867 wt %.

In other embodiments of the high oxidation-resistant alloy, N is present in an amount of up to 0.005 wt %, and Mg, Mo, B, Zr, Fe, O, S, or a mixture thereof in an amount of up to 0.882 wt %.

In other embodiments of the high oxidation-resistant alloy, S is present in an amount of up to 0.004 wt %, and Mg, Mo, B, Zr, Fe, O, N, or a mixture thereof in an amount of up to 0.883 wt %.

In embodiments, the high oxidation-resistant alloy has a nominal composition consisting of:

| | |
|---|---|
| Co | 9.00-9.50 wt % |
| W | 9.30-9.70 wt % |
| Cr | 8.00-8.70 wt % |
| Al | 4.00-10.50 wt % |
| Ti | 0.60-0.90 wt % |
| Ta | 2.80-3.30 wt % |
| Hf | up to 1.20 wt % |
| Mn | up to 0.05 wt % |
| Mg | up to 0.008 wt % |
| Mo | up to 0.60 wt % |
| Si | up to 0.02 wt % |
| B | up to 0.015 wt % |
| Zr | up to 0.015 wt % |
| Fe | up to 0.20 wt % |
| O | up to 0.020 wt % |
| N | up to 0.0050 wt % |
| S | up to 0.0040 wt % |
| C | up to 0.065 wt % |
| Re | 0.0-0.4 wt % |
| Ni | balance | based on the alloy weight.

In embodiments of the high oxidation-resistant alloy, Al is present in an amount of 5.25-5.75 wt %.

In other embodiments of the high oxidation-resistant alloy, Hf is present in an amount of 1.00-1.20 wt %.

In other embodiments of the high oxidation-resistant alloy, Re is present in an amount of 0.0-3.0 wt %.

An embodiment corresponds to a high oxidation-resistant alloy having a nominal composition consisting of:

| | |
|---|---|
| Co | 9.07 wt % |
| W | 9.36 wt % |
| Cr | 8.43 wt % |
| Al | 5.73 wt % |
| Ti | 0.65 wt % |
| Ta | 2.93 wt % |
| Mo | 0.51 wt % |
| Hf | 1.02 wt % |
| Mn | up to 0.001 wt % |
| Mg | up to 0.060 wt % |
| Si | 0.06 wt % |
| B | 0.010 wt % |
| Zr | 0.012 wt % |
| Fe | 0.035 wt % |
| O | 0.014 wt % |
| N | 0.002 wt % |
| S | up to 0.010 wt % |
| C | 0.043 wt % |
| Re | 0.0 wt % |
| Ni | balance | based on the alloy weight.

With reference to FIG. 1, the observed oxidation damage of conventional alloy 'Mar M 247 LC' is characterized by spiking oxidation attack. The EDS analysis of the internal oxidation reveals that the $Al_2O_3$ is in one embodiment present along with Hf and Ta oxides. One possible explanation of this type of oxidation is that Hf carbides have greater affinity for oxygen than the matrix metal. Some literature studies show that $HfO_2$ particles act as short circuit diffusion paths for oxygen transportation, due to the fact that the diffusivity of oxygen in $HfO_2$ is several orders of magnitude higher than in $Al_2O_3$. This leads to in one embodiment localize scale thickening in the neighborhood of these particles, thus causing a deep penetration of the formed $HfO_2$ scales into the substrate. The oxygen transported through this short circuit diffusion path reacts with Al atoms in the surrounding areas to form $Al_2O_3$ scales. Therefore, $HfO_2$ 'pegs' scales surrounded by $Al_2O_3$ scales are formed.

Figure 2:
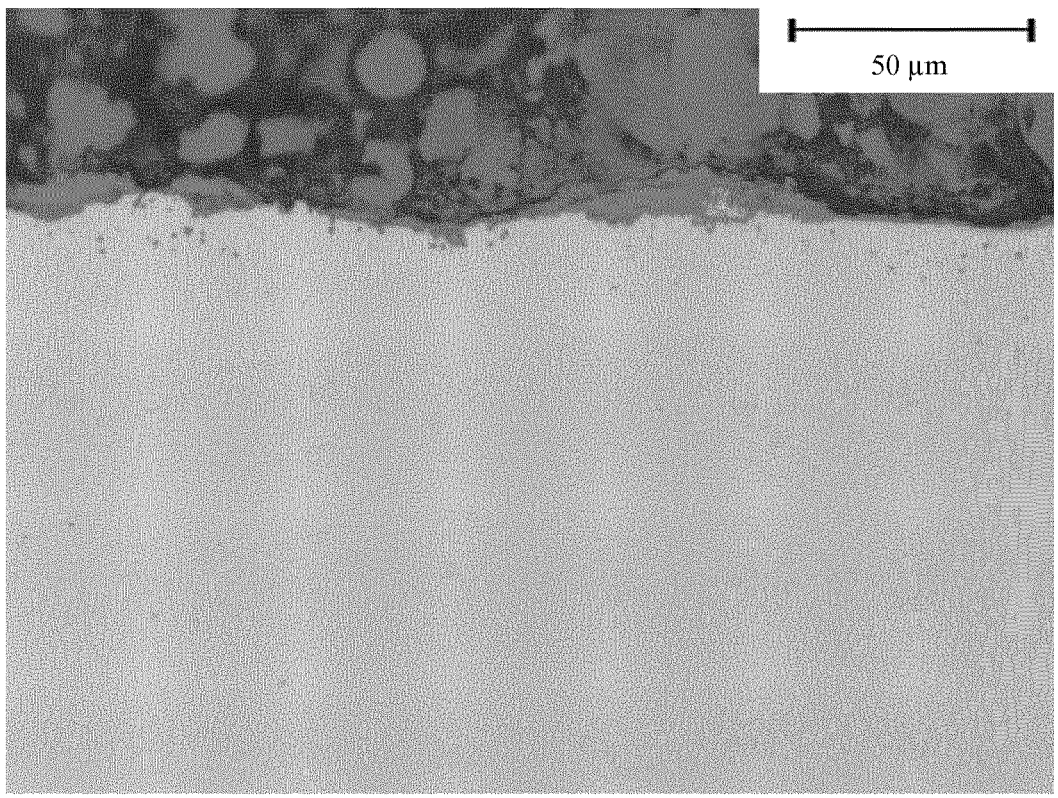
FIG. 2 shows a micrograph taken by Optical Microscope of the oxidation surface of the alloy of Example 1, after 1000 h at 980° C.

Conversely, with reference with FIG. 2, the alloy herein disclosed shows a homogeneous oxide layer without in one embodiment localized scale thickening, but with a total affected layer that resulted half of that of conventional alloy 'Mar M 247 LC'.

Figure 3:
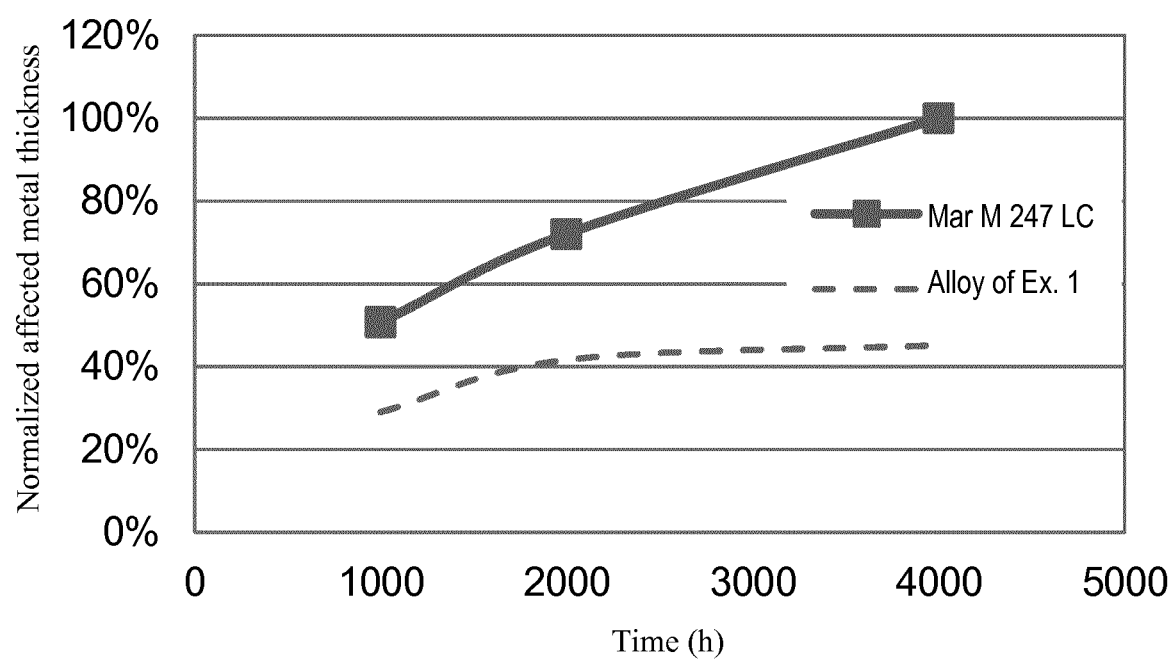
FIG. 3 shows the affected metal thickness at 980° C. after different times (from 1000 to 4000 hours) for the alloy Mar M247 LC and the alloy of Example 1. The thickness is normalized with respect to the maximum affected thickness in the alloy Mar M 247 LC.

Oxidation tests performed on the herein disclosed alloy demonstrated that its oxidation resistance is increased with respect to conventional alloy 'Mar M 247 LC', i.e. a comparative Ni-based superalloy, as shown FIG. 3.

The alloy herein disclosed can be obtained by processes known in the art, such as Powder Metallurgy, Investment Casting, Direct Metal Laser Melting (DMLM), Selective Laser Melting (SLM), Selective Laser Sintering (SLS), Laser Metal Forming (LMF) or Electron Beam Melting (EBM).

In general, the process of production of the alloy can be carried out until a desired thickness and shape of the alloy is achieved.

However, in one embodiment of the processes, the alloy is obtained by Direct Metal Laser Melting (DMLM), followed by a Hot Isostatic Press (HIP) process. The resulting alloy solution is then heat treated and allowed to cool and harden.

In some embodiments, the alloy is obtained by DMLM, wherein the power source has an energy power of 150-370 W, more particularly in one embodiment of about 350 W.

In other embodiments, the resulting powder layer thickness is, in an embodiment, lower than 0.06 mm (i.e. 60 microns). Particularly in one embodiment a layer thickness of about 0.04 mm.

The power source scan spacing is, in an embodiment, arranged in order to provide substantial overlapping of adjacent scan lines. An overlapping scan by the power source enables stress reduction to be provided by the subsequent adjacent scan, and may effectively provide a continuously heat treated material.

A Hot Isostatic Press (HIP) process is then performed in order to obtain the alloy with the desired characteristics. Good results have been obtained from 4 hours on, at 140 MPa and 1260° C. with heat up and cool down rates of 8-15° C./min.

The resulting alloy solution is then heat treated and allowed to cool and harden.

Second embodiments of the subject matter disclosed herein correspond to a gas turbine component, such as a bucket, nozzle, combustion chambers, and shroud, made of the above alloy.

It should be also understood that all the combinations of aspects of the alloy, and process of production, as well as their uses in gas turbine applications, as above reported, are to be deemed as hereby disclosed.

While the disclosed embodiments of the subject matter described herein have been fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

EXAMPLES

Example 1

An alloy has been prepared having the following nominal composition:

| | |
|---|---|
| Co | 9.07 wt % |
| W | 9.36 wt % |
| Cr | 8.43 wt % |
| Al | 5.73 wt % |
| Ti | 0.65 wt % |
| Ta | 2.93 wt % |
| Mo | 0.51 wt % |
| Hf | 1.02 wt % |
| Mn | up to 0.001 wt % |
| Mg | up to 0.060 wt % |
| Si | 0.06 wt % |
| B | 0.010 wt % |
| Zr | 0.012 wt % |
| Fe | 0.035 wt % |
| O | 0.014 wt % |
| N | 0.002 wt % |
| S | up to 0.010 wt % |
| C | 0.043 wt % |
| Re | 0.0 wt % |
| Ni | balance | based on the alloy weight.

The alloy was obtained by DMLM, wherein the power source had an energy power of about 350 W. The resulting powder layer thickness was of about 0.04 mm.

The power source scan spacing was, in an embodiment, arranged in order to provide substantial overlapping of adjacent scan lines. An overlapping scan by the power source enabled stress reduction to be provided by the subsequent adjacent scan, and may effectively provide a continuously heat treated material.

A Hot Isostatic Press (HIP) process was then performed from 4 hours on, at 140 MPa and 1260° C. with heat up and cool down rates of 8-15° C./min.

The resulting alloy solution was then heat treated and allowed to cool and harden.

Example 2

Oxidation resistance of the alloy of Example 1 has been evaluated by carrying out static oxidation tests at 870° C. up to 4000 hours.

Tests were carried out on dish samples with a diameter of 25 mm and a thickness of 3 mm.

Oxidated samples were cut in two parts and conventionally prepared for metallographic observation of their thickness. They were observed by Optical Microscope and the total affected layer by oxidation was measured.

OM microstructures for conventional Mar M247 LC (FIG. 1) and the alloy of Example 1 (FIG. 2) are reported. In particular, the oxidation damage of conventional Mar M247 LC characterized by spiking oxidation attacks due to Hafnium Carbides is well recognizable in FIG. 1. On the other hand, the alloy of Example 1 is characterized by a homogeneous oxidation layer.

FIG. 3 shows the affected metal thickness at 980° C. after different times (from 1000 to 4000 hours) for conventional Mar M247 LC and the alloy of Example 1. The thickness is normalized with respect to the maximum affected thickness in Mar M 247 LC. It is well visible the better oxidation behavior of the alloy of Example 1 for which the affected metal thickness is halved with respect to conventional Mar M247 LC.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An oxidation-resistant alloy having a nominal composition consisting of:

| | |
|---|---|
| Co | 9.00-9.50 wt % |
| W | 9.30-9.70 wt % |
| Cr | 8.00-8.70 wt % |
| Al | greater than 7.00 up to and including 15.50 wt % |
| Ti | 0.60-0.90 wt % |
| Ta | 2.80-3.30 wt % |
| Mo | 0.40-0.60 wt % |
| Hf | less than 0.1 wt % |
| Mn | up to 0.05 wt % |
| Si | up to 0.02 wt % |
| C | up to 0.065 wt % |
| Re | 0.00-4.00 wt % |

| | |
|---|---|
| Mg, B, Zr, Fe, O, N, S, or a mixture thereof | greater than 0.251 up to and including 0.287 wt % |
| Ni | balance | based on the alloy weight.

2. The oxidation-resistant alloy of claim 1, obtainable by Powder Metallurgy, Investment Casting, Direct Metal Laser Melting (DMLM), Selective Laser Melting (SLM), Selective Laser Sintering (SLS), Laser Metal Forming (LMF) or Electron Beam Melting (EBM).

3. A method for producing a turbomachine component, comprising producing the component by additive manufacturing technologies employing an oxidation-resistant alloy having a nominal composition consisting of:

| | |
|---|---|
| Co | 9.00-9.50 wt % |
| W | 9.30-9.70 wt % |
| Cr | 8.00-8.70 wt % |
| Al | 4.00-15.50 wt % |
| Ti | 0.60-0.90 wt % |
| Ta | 2.80-3.30 wt % |
| Mo | 0.40-0.60 wt % |
| Hf | up to 1.20 wt % |
| Mn | up to 0.05 wt % |
| Si | up to 0.02 wt % |
| C | up to 0.065 wt % |
| Re | 0.00-4.00 wt % |
| Mg, B, Zr, Fe, O, N, S, or a mixture thereof | up to 0.287 wt % |
| Ni | balance | based on the alloy weight.

* * * * *